Jan. 31, 1961 W. C. RIESTER 2,969,776
FLUID MOTOR
Filed Jan. 12, 1959

INVENTOR.
WILLIAM C. RIESTER
BY
Bean Brooks Buckley & Bean.
ATTORNEYS

United States Patent Office 2,969,776
Patented Jan. 31, 1961

2,969,776
FLUID MOTOR
William C. Riester, Williamsville, N.Y., assignor to Trico Products Corporation, Buffalo, N.Y.
Filed Jan. 12, 1959, Ser. No. 786,380
7 Claims. (Cl. 121—48)

The present invention relates to an improved fluid pressure motor.

It is the object of the present invention to provide an improved double-acting fluid pressure motor which has the combined advantages of simplicity of construction, efficiency of operation, and economy of manufacture. Other objects and attendant advantages of the present invention will readily be perceived hereafter, and the present invention will be more fully understood when the following portions of the specification are read in conjunction with the accompanying drawings wherein.

Figure 1:
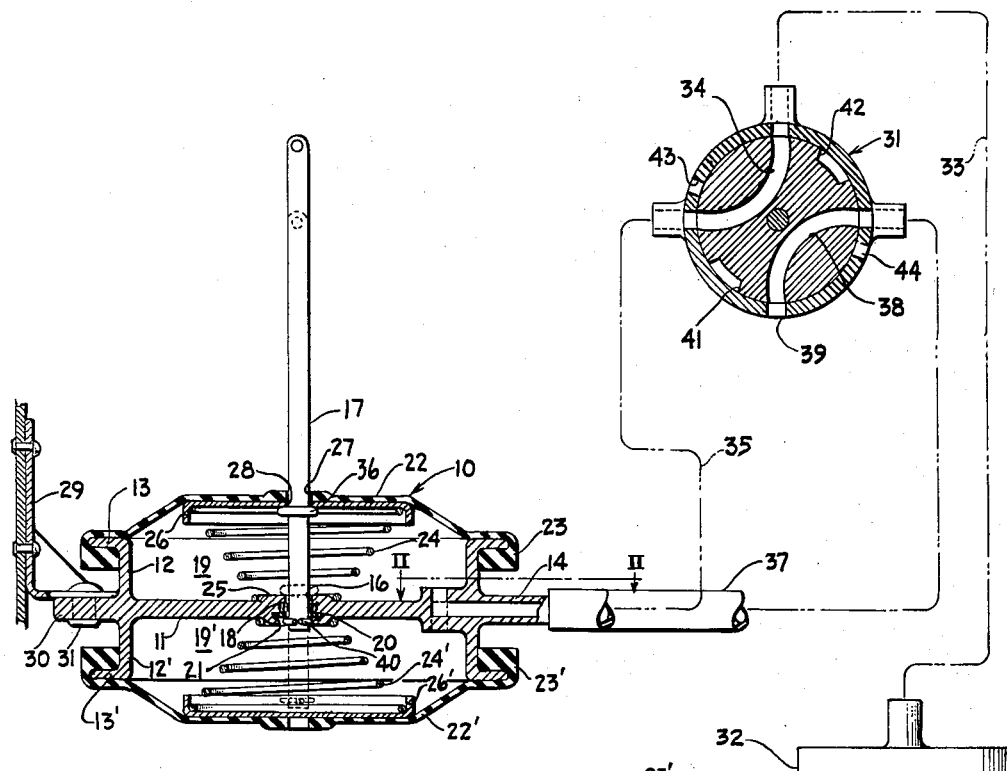
Fig. 1 is a view of the improved fluid pressure motor, partially in cross-section, installed in a fluid pressure system.
Figure 2:
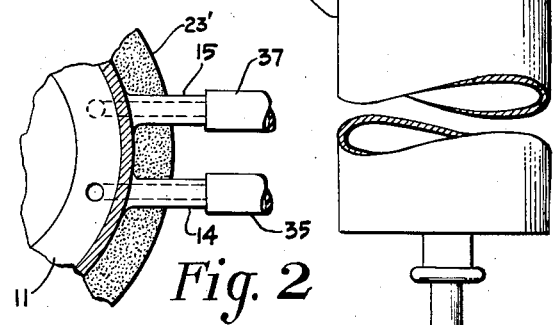
Fig. 2 is a view of the fluid pressure motor taken along line II—II of Fig. 1.

In Fig. 1 the improved motor 10 of the present invention is shown. This motor consists of a circular base member 11 having integral opposed substantially cylindrical side walls 12 and 12' extending therefrom to define opposed dished surfaces with said base member as a common wall. Cylindrical surfaces 12 and 12' have outwardly extending flanges 13 and 13', respectively, at the ends thereof. Conduits 14 and 15 are formed integrally with base member 11, and the entire member may be made by die-casting. It will be understood that while member 11 is shown as being made of metal, it can also be made of a rigid plastic material by a molding operation.

Member 11 is provided with a centrally located aperture 16. A link such as shaft 17 extends through aperture 16, and a packing such as O-ring 18 surrounds shaft 17 to prevent fluid communication between chambers 19 and 19', which are on opposite sides of base 11. O-ring 18 is held in position on base 11 by a shoulder (not numbered) of aperture 16 on one side thereof and washer 20 on the other side thereof, washer 20 being suitably staked as at 21.

Flexible diaphragms 22 and 22' complete the enclosing of chambers 19 and 19', respectively. The edges 23 and 23' of each of the diaphragms 22 and 22', respectively, are in the form of beads having surfaces which are adapted to be placed in complementary mating relationship with flanges 13 and 13'. This construction obviates the necessity for having any additional fastening elements between the flanges and the edges of the diaphragm because the inherent resiliency of the beads will provide a fluid-tight seal when the diaphragms are snapped into position.

In order to return motor 10 to the neutral position shown in the drawing when the motor is not subjected to vacuum, springs 24 and 24' are provided in chambers 19 and 19', respectively. The lower end of spring 24 is positioned about projection 25 surrounding aperture 16 and the upper end of spring 24 bears against dished washer 26. The upper end of spring 24' is located about the stakes 21 and the lower end thereof rests within dished plate 26'.

Diaphragms 22 and 22' are identical, this feature reducing the cost of manufacturing. As can be seen from Fig. 1, shaft 17 extends through aperture 27 in diaphragm 22. However, the corresponding aperture in diaphragm 22' is obstructed by dished plate 26'. Thus, identical diaphragms may be used for both sides of the motor without modification, notwithstanding that they are used in a different manner. A seal between the shaft and diaphragm 22 is provided by the edges of aperture 27.

The motor is subjected to a relatively small amount of friction in operation because shaft 17 is in engagement only with packing 18 and the edges of aperture 27 in diaphragm 22. A bracket 29 is fastened to extension 30 of base member 11 as by rivets 31. Bracket 29 is for the purpose of attaching motor 10 in its operating environment.

When it is desired to move shaft 17 downwardly to its dotted line position, control valve 31 is caused to assume the position shown in Fig. 1. This will permit communication of vacuum between tank 32 and chamber 19 through conduit 33, conduit 34 within valve 31, conduit 35, and conduit 14 which forms a part of base 11. The evacuation of chamber 19 will result in a downward movement of diaphragm 22 against the bias of spring 24. The downward movement of diaphragm 22 will result in a corresponding downward movement of dished washer 26, and the edges of aperture 28 will engage collar 36 on shaft 17 and cause it to move downwardly.

In order to insure that diaphragm 22' is in its lowermost position shown in the drawing when chamber 19 is evacuated, valve 31 causes chamber 19' to be vented to the atmosphere when chamber 19 is being evacuated. This venting is achieved through conduit 15 in base member 11, conduit 37, conduit 38 in valve 31, and venting aperture 39.

Whenever it is desired to cause shaft 17 to move upwardly to its solid line position, valve 31 is manipulated so that conduit 38 therein causes communication between conduits 33 and 37 while conduit 34 causes conduit 35 to be vented to the atmosphere through aperture 39. When conduit 38 causes communication between conduits 33 and 37, chamber 19' of motor 10 is in communication with vacuum tank 32 through conduit 15 in base 11, conduit 37, conduit 38, and conduit 33. Evacuation of chamber 19' will cause diaphragm 22' to move upwardly toward base 11. Assuming that shaft 17 was in its lowermost position prior to the evacuation of chamber 19', the upward movement of diaphragm 22' will result in the engagement between plate 26' and the end of shaft 17 with the result that shaft 17 will be moved upwardly as chamber 19' is evacuated. Snap ring 40, which is positioned proximate the end of shaft 17, engages washer 20 when shaft 17 is in its uppermost position, this engagement defining the limit of uppermost movement of the shaft.

It will be noted that valve 31 is provided with venting apertures 41 and 42. Whenever aperture 41 is caused to bridge both conduit 35 and venting aperture 43 in valve 31, venting aperture 42 will be caused to bridge both conduit 37 and venting aperture 44. This will permit chambers 19 and 19' to be vented to the atmosphere whereby the springs in these chambers will cause diaphragms 22 and 22' to return to the neutral position shown in the drawings. However, shaft 17 will remain in its position in which it was last placed when motor 10 was actuated.

Since there is relative movement between shaft 17 and the diaphragm associated with the chamber which is not being evacuated, it may be considered that there is a lost-motion connection between shaft 17 and each of the diaphragms. As stated above, this permits shaft 17 to remain in the position in which it was last placed when the springs 24 and 24' return the diaphragms 22 and 22', respectively, to the neutral position shown in Fig. 1. In addition, these lost-motion connections prevent the diaphragm which is not actively being used to move shaft 17 from impeding its movement.

Figure 3:
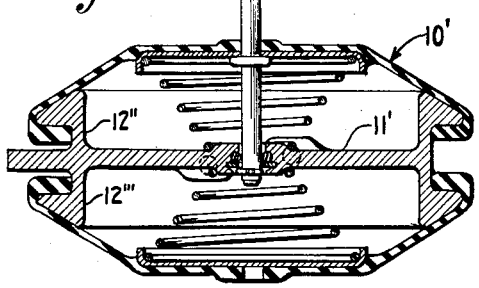
Fig. 3 is a view, partially in cross-section, of an alternate embodiment of the fluid pressure motor shown in Fig. 1.

An alternate embodiment of this invention is shown in Fig. 3. This embodiment is basically similar in operation and construction to the embodiment of Fig. 1. However, the embodiment of Fig. 3 has shorter cylindrical side walls 12" and 12''' extending from base member 11'. This permits motor 10' to occupy a smaller space than the motor shown in Fig. 1.

It will thus be seen that an improved fluid motor has been described which is manifestly capable of achieving all of the above enumerated objects of the present invention. More specifically, the small number of parts results in simplicity of construction; the small number of friction points within the motor results in efficiency of operation; and the small number of parts, the identical nature of certain of the parts, and the inherent susceptibility of the parts to be assembled without the use of independent fastening means results in low manufacturing cost.

While preferred embodiments of the present invention have been described, it is to be understood that it is not to be limited thereto but may be otherwise embodied within the scope of the following claims.

What is claimed is:

1. A fluid pressure motor comprising base means forming a plurality of opposed dished surfaces, a flexible diaphragm adapted to extend across each dished surface whereby said base means and said diaphragms form a plurality of adjacent chambers, conduit means for permitting each of said chambers to communicate with a fluid pressure source, link means, lost-motion connections between said link means and said diaphragms, said lost-motion connections including means adapted to selectively interconnect said link means and the diaphragm associated with the chamber caused to communicate with the fluid pressure source whereby the movement of either of said diaphragms under the influence of fluid pressure causes a corresponding positioning of said link means.

2. A fluid pressure motor comprising a base member, a flexible diaphragm mounted on each side of said base member for forming a plurality of chambers with said base member as a common wall therebetween, link such as fluid conduit connections associated with each of said chambers, links means adapted to be movably mounted relative to each of said diaphragms, means responsive to the communication of fluid pressure with either of said chambers to cause a deflection of the diaphragm associated with said chamber, and means to cause engagement between said diaphragm and said link means to cause said link means to assume a position corresponding to the movement of the diaphragm.

3. A fluid pressure motor comprising a base member, a diaphragm mounted on each side of said base member whereby said base member and said diaphragms define a plurality of chambers with said base member forming a common wall of said chambers, fluid pressure conduit connections in said base member for conducting fluid to said chambers, a shaft member, a lost-motion connection between each of said diaphragms and said shaft member, said lost-motion connection including means for selectively coupling each of said diaphragms to said shaft member whereby the distending of a diaphragm due to the existence of fluid pressure in a chamber will cause said shaft to assume a predetermined position.

4. A fluid pressure motor comprising a base member having oppositely dished surfaces, flexible diaphragm means attached across the open sides of said dished surfaces to form a plurality of adjacent substantially fluid-tight chambers, conduit connections to each of said chambers, shaft means, lost-motion connections between said diaphragm means and said shaft means, said lost-motion connections including means for causing said shaft means to be engaged by one of said diaphragm means when either of said chambers is subjected to fluid pressure whereby the movement of either diaphragm under the influence of fluid pressure causes a corresponding positioning of said shaft means, said lost-motion connection permitting unimpeded movement of said shaft means relative to the other of said diaphragm means.

5. A fluid pressure motor comprising a base member having opposed dished surfaces, an apertured flexible diaphragm adapted to extend across each dished surface whereby said base member and said diaphragms form two adjacent chambers, conduit connections to said chambers, an aperture in said base member, a shaft member extending through said aperture in said base member and through an aperture in one of said flexible diaphragms, spring means extending between said base member and each of said diaphragms, and a member positioned between each of said spring means and said diaphragms, one of said members having an aperture therein in alignment with the aperture in said flexible diaphragm for permitting said shaft to extend therethrough, the other of said members blocking the aperture in the other of said diaphragms.

6. A fluid pressure motor comprising a base member having opposed dished surfaces, a flexible diaphragm adapted to extend across each of said dished surfaces whereby said base member and said diaphragms form adjacent chambers, conduit means in communication with said chambers, bead means on the edges of said diaphragms adapted to engage the rims of said dished surfaces to provide a substantially fluid-tight connection therewith, link means adapted to be operatively coupled to said diaphragm means, a lost-motion connection between said link means and said diaphragm means, said lost motion connection including means for selectively coupling each of said diaphragm means to said link means whereby the supplying of fluid pressure to either of said chambers through said conduit means will cause a deflection of the diaphragm associated with that chamber to cause said link means to assume a predetermined position, said lost-motion connection permitting movement of said link means with respect to the other of said diaphragms.

7. A fluid pressure motor comprising base means defining first and second opposed dished surfaces, a first flexible diaphragm adapted to extend across said first dished surface to define a first chamber therewith, a second flexible diaphragm adapted to extend across said second dished surface to define a second chamber therewith, a first conduit in communication with said first chamber, a second conduit in communication with said second chamber, said first and second conduits selectively adapted to be placed in communication with a fluid pressure source, link means operatively associated with said first and second diaphragms, lost-motion connections between said link means and both of said diaphragms, said lost-motion connections including means for selectively coupling each of said diaphragms to said link means in response to the supplying of fluid pressure to either said first or said second chambers to thereby effect a corresponding positioning of said link means.

References Cited in the file of this patent

UNITED STATES PATENTS

| 1,995,611 | Hapgood | Mar. 26, 1935 |
| 2,000,890 | Hueber et al. | May 7, 1935 |
| 2,693,084 | Badger | Nov. 2, 1954 |

FOREIGN PATENTS

| 181,966 | Switzerland | Apr. 1, 1936 |
| 924,009 | France | Mar. 3, 1947 |

UNITED STATES PATENT OFFICE
CERTIFICATION OF CORRECTION

Patent No. 2,969,776            January 31, 1961

William C. Riester

It is hereby certified that error appears in the above numbered patent requiring correction and that the said Letters Patent should read as corrected below.

Column 3, lines 49 and 50, strike out "link such as".

Signed and sealed this 13th day of June 1961.

(SEAL)
Attest:

ERNEST W. SWIDER            DAVID L. LADD
Attesting Officer            Commissioner of Patents